United States Patent
Lee et al.

(10) Patent No.: US 7,065,248 B2
(45) Date of Patent: Jun. 20, 2006

(54) CONTENT-BASED MULTIMEDIA SEARCHING SYSTEM USING COLOR DISTORTION DATA

(75) Inventors: Jin Soo Lee, Seoul (KR); Hyun Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 699 days.

(21) Appl. No.: 09/860,464

(22) Filed: May 21, 2001

(65) Prior Publication Data

US 2001/0055419 A1    Dec. 27, 2001

(30) Foreign Application Priority Data

May 19, 2000    (KR) ................................ 2000-26969

(51) Int. Cl.
*G06K 9/00*    (2006.01)

(52) U.S. Cl. ...................... 382/165; 382/167; 382/274; 382/275; 382/305; 358/518

(58) Field of Classification Search ................ 382/162, 382/169, 190–191, 274–275, 305, 165, 167; 345/589–590, 600–604; 358/403, 461, 518–523

See application file for complete search history.

(56) References Cited

U.S. PATENT DOCUMENTS

| | | | | |
|---|---|---|---|---|
| 5,664,072 A | * | 9/1997 | Ueda et al. | .................. 358/1.9 |
| 5,751,845 A | * | 5/1998 | Dorff et al. | .................. 382/162 |
| 5,995,668 A | * | 11/1999 | Corset et al. | ............... 382/233 |
| 6,034,665 A | * | 3/2000 | Kim | ........................... 345/593 |
| 6,246,803 B1 | * | 6/2001 | Gauch | ........................ 382/276 |
| 6,400,853 B1 | * | 6/2002 | Shiiyama | .................... 382/305 |

* cited by examiner

*Primary Examiner*—Bhavesh M. Mehta
*Assistant Examiner*—Yubin Hung
(74) *Attorney, Agent, or Firm*—Fleshner & Kim, LLP

(57) ABSTRACT

Methods are provided for extracting color distortion data from multimedia data in a content-based multimedia search and for searching multimedia data based on the extracted color distortion data. A method is also provided for generating multimedia data to be used in the content-based multimedia search. The color distortion data includes hues of the distorted color identifying which color affected such a distortion and intensity data representing how much color distortion data affected such a distortion.

20 Claims, 9 Drawing Sheets

CONTENT-BASED MULTIMEDIA SEARCHING SYSTEM USING COLOR DISTORTION DATA

FIELD OF THE INVENTION

The present invention relates to a content-based multimedia search. More, particularly, this invention relates to a method for extracting color distortion data from multimedia data and a method for searching multimedia data using the extracted color distortion data. This invention also relates to a method for generating multimedia data including the color distortion data.

DESCRIPTION OF THE RELATED ART

In recent years, more attention has been paid to researches on a content-based multimedia search. In the content-based multimedia search, color data, texture data or shape data are mainly used as features for the search. Of those features, color data are considered as the most significant data.

However, the color data have a drawback of being vulnerable to a distortion due to a background illumination of the data or characteristics of an image capture device, etc.

For example, identical images, if those were captured by different devices or under different illuminations, are recognized to be similar by a human eye, but those images can be recognized to be different images by a computer analysis. Such a distortion can seriously deteriorate the performance of a multimedia data search.

For this reason, recent researches are focusing methods for searching multimedia data without being affected by such an illumination. Most of the conventional art adopts a method of performing searches by ignoring the color elements that are vulnerable to distortions caused by an illumination.

For instance, for a search regardless of brightness, performs the search without using the brightness element among the color elements. In similar fashion, for a search regardless of an illumination including a particular color performs the search without using the color element.

However, the conventional method of performing searches by ignoring a particular color element has a drawback that searching performance is generally low as failing to precisely reflecting a distortion of the color. If analyzing color distortion characteristics generated due to natures of an illumination or a device and using a relevant method for compensating the distortion corresponding to the characteristics of each data based on the analyzed color distortion characteristics, it is expected to achieve higher searching performance.

SUMMARY OF THE INVENTION

It is, therefore, an object of the present invention to provide a method for extracting color distortion data from multimedia data in a content-based multimedia searching system and a method for searching multimedia data using the extracted color distortion data to enhance searching performance.

It is another object of the invention to provide a method for generating multimedia data including the extracted color distortion data in order to effectively use in a content-based multimedia search.

To achieve the above object according to one aspect of the present invention, there is provided a content-based multimedia searching method using color distortion data in a content-based multimedia searching system. The method comprising: extracting color distortion data from multimedia data; restoring the distorted color of the multimedia data to the original color by using the extracted color distortion data; measuring a similarity between the multimedia data restored to the original color; and aligning the multimedia data on the basis of the measured similarity.

According to another aspect of the present invention, there is provided a content-based multimedia searching method using color distortion data in a content-based multimedia searching system, the method comprising: extracting color distortion data from multimedia data extracting features to be used for the search; storing the extracted features and the color distortion data; restoring the value of the features to values corresponding to the features of the original color by using the stored color distortion data; measuring a similarity between the multimedia data by using the restored value of the features; and aligning the multimedia data on the basis of the measured degrees of similarity.

According to still another aspect of the present invention, there is provided a content-based multimedia searching method using color distortion data in a content-based multimedia searching system, the method comprising: extracting a hue value of the distorted color as color distortion data from multimedia data; dividing an image into N*M number of local areas and extracting representative color values of each area as features to be used for the search; storing the extracted features and color distortion data; restoring the representative color values of each area to a value corresponding to the original color by using the hue value of the stored distorted color; measuring a similarity between the multimedia data by using the restored value of the features; and aligning the multimedia data on the basis of the measured similarity.

In the above methods, the extracted color distortion data are hue data.

The process of restoring the original color by using the hue data comprises: converting distorted color values to corresponding R, G, B values satisfying the hue values of the color distortion data, assuming That the max (RGB) and min (RGB) values are fixed to be predetermined constants; and calculating a relative variation of the distorted color value by multiplying the R, G, B value of the hue value by predetermined constants; and subtracting the distorted color value from original R, G, B value for each pixel.

The method for extracting color distortion data to use in the content-based multimedia searching method using the color distortion data comprises: calculating an average hue and a variation of the hue values for all pixels having a brightness value and a chromatic value, which are same as or less than a predetermined critical value; calculating an average hue and a variation of hue values for all pixels having a brightness value same as or greater than a predetermined critical value and a chromatic value same as or less than a predetermined critical value; and designating a re-averaged value of the two average hue values as a hue of the distorted color, if both of the two variation values calculated as above are same as or less than a predetermined critical value and a difference between the two average hue values is same as or less than a predetermined critical value.

If only one of the two calculated variation values is same as or less than a predetermined critical value, the method for extracting the color distortion data further comprises: generating a hue histogram for all pixels of an image; extracting a hue having a maximum variation value in the generated hue histogram; and designating an average value between the extracted hue value and the average hue value having a variation same as or less than the predetermined critical value as a hue of the distorted color, if the variation of the extracted hue is same as or greater than a predetermined critical value.

According to further aspect of the present invention, the method for extracting the color distortion according to the present invention comprises: dividing an image into N*M number of areas; calculating an average hue and a variation of the hue values for all pixels having a brightness value and a chromatic value same as or less than a predetermined critical value for each divided area and register the average hue as a candidate of distorted dark color only when the variation is same as or less than a predetermined critical value; calculating an average hue and a variation of the hue value for all pixels having a brightness value same as or greater than a predetermined critical value and a chromatic value same as or less than a predetermined critical value for each divided area and register the average hue as a candidate of distorted bright color only when the variation is same as or less than a predetermined critical value; calculating an average of the hues registered as the candidates of distorted dark color and the hues registered as the distorted bright color, and designating a re-averaged hue value of the two average hue values as a distorted hue, if a difference between the two average hue values is same as or less than a predetermined critical value; calculating a ratio of the number of the registered candidate hues to N*M number of object areas divided from the entire image; and designating the ratio as an intensity of the color distortion.

The method for extracting color distortion further comprises: designating an average hue value of the registered hues as a distorted hue only when the number of registered hues is same as or greater than a predetermined critical value if there are registered hues in only one of the candidate of distorted bright color or the candidate of distorted dark color; calculating a ratio of the number of registered candidate hues to N*M number of object areas divided from the entire image; and designating the ratio as an intensity of the color distortion.

The method for extracting color distortion further comprises: further extracting the intensity of the distorted color from the color distortion data; and restoring a representative local color value in proportion to the intensity when restoring the color.

According to still further aspect of the present invention, the method for generating multimedia data in order to use in a content-based multimedia search using color distortion data comprises: incorporating feature information; and incorporating color distortion data; wherein the color distortion data comprises hues of the distorted color identifying which color affected such a color distortion; and intensity data representing how much the color distortion data affected such a distortion.

Before describing the method for extracting color distortion data and the method for searching multimedia data using the extracted color distortion data according to the present invention, the technical background and features of this invention will be discussed in advance.

In general, distortion of a color is attributable to various factors including an illumination or characteristics of a device used for acquisition of images, an encoder or a filter.

When explaining how the original color of an image has been distorted by another color due to a certain reason including an illumination, the color causing the distortion is referred to a distorting color. For example, if the illumination of a red color has affected an image at the time of acquiring the image, it is assumed that a red color tone has been added to the original color of the image, thereby making the comprehensive hue of the color be red.

Therefore, if the distorting color is a red color, and if a degree of distortion can be measured, the original color can be restored by reducing the red color tone from the distorted image.

However, it is quite difficult to identify whether or not a red color of the given image has really affected the distortion, and the conventional art has not yet attempted to identify the particular distorting color.

That is because, assuming that a particular image contains a red hue, there is no clear reference to determine whether the red color is the original red color or another color has been distorted to be red.

Accordingly, the present invention provides a method of automatically extracting the distorting color. The invention uses the following characteristics of the distorted image.

Distortion Sensitivity to the Hue

If a color of a particular hue (a comparative value of R, G, B) is added, distortion sensitivity to the hue representing the degree of hue distortion is much higher as the chroma is low by nature of color. Therefore, the original color with a particular hue of a high chroma is not easily changed to have a different hue even if a distorting color of another hue is added thereto.

However, with a fairly low chroma such as white or black, the original color is easily changed to have a hue close to the distorting color due to the added distorting color.

Thus, searching pixels of a color having a low chroma serves to verify whether or not the distorting color of a particular hue has affected the image data. In other words, color distortion is highly likely to occur when all of the corresponding pixels of a low chroma have a definite hue.

Characteristics of a Device or an Encoder

When an image is captured by an image capture device such as a digital movie camera and is displayed thereby, it is common that the hue of the image is varied in accordance with the device.

Such a phenomenon is attributable to the characteristics of the device itself or to the slightly different indexing algorithms according to indexing means (i.e., the encoder) for storing the captured image as a file. Such an image has the following characteristics.

In most of images, even a gray area such as a white or a black color has a certain hue if analyzing pixels of the colon Even when perceived to be white or black by human eyes, the color expressed by a computer contains a slight extent of hue. This hue can be definitely presented even if an image file was encoded and stored by one device or same encoding means.

If analyzing hues of the pixels appearing to be a black color in a frame of a motion picture, those pixels have a definite hue irrespective of their positions within the frame.

Accordingly, if the pixels of a fairly low chroma such as a gray area have the same hue in a single image frame, the hue is highly likely to have been generated according to the characteristics of the device or the encoder.

Therefore, to enhance the searching performance, it is desirable to consider a pure gray area by removing this hue.

The distorting color can be extracted based on the characteristics described above. The present invention is to restore an original color by using such color distortion data.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
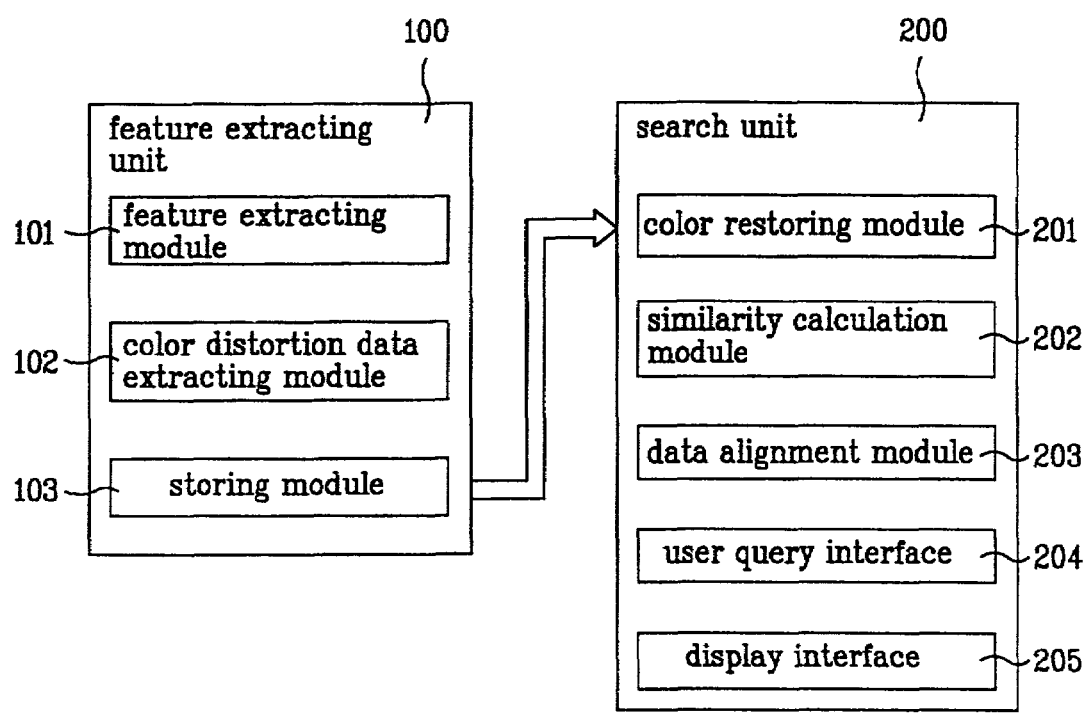
FIG. 1 is a block diagram illustrating a content-based multimedia searching system using color distortion data according to the present invention.

FIG. 1 is a block diagram illustrating a content-based multimedia searching system using color distortion data according to the present invention.

Referring to FIG. 1, a feature extracting unit 100 includes a feature extracting module 101 for extracting necessary features.

As a feature for the search, a color feature such as a color histogram, texture or shape is generally used.

A color distortion data extracting module 102 extracts the color distortion data by using the algorithm suggested by the present invention.

According to the embodiment shown in FIG. 1, the hue data of a distorting color and intensity data are extracted as color distortion data.

Storing module 103 stores the features and the color distortion data extracted as above.

Searches are performed upon queries by a user. In general, the queries are made by the user's designation of reference data to search similar data. To perform the searches, a color restoring module 201 of the search unit 200 acquires features and color distortion data stored in the storing module 103, and restores the distorted color value to the original color value by using the color distortion data.

A similarity calculation module 202 calculates a similarity between the object data based on the restored feature value. Based upon the calculated similarity, the object data are aligned and displayed by a data alignment module 203.

In the drawing, reference numeral 204 represents a user query interface for inputting queries by the user, and the reference numeral 205 represents a display interface for displaying the search result.

According to an embodiment of the present invention, multimedia search is performed by extracting a distorting color and restoring the original color based on the extracted color distortion data. In the invention, two types of methods can be used to perform the search.

The first method is to restore the original color for each pixel of an image by using the color distortion data, and then extract feature data required for searches, such as a color histogram.

Although this method can be efficient for precise restoration of a color, it has a drawback that feature data represent only the restored original color data, falling to represent the distorted image per se, i.e., the visible color data per se perceived by the user's eyes.

The second method is to extract feature data from a distorted image, and then convert the feature data value to the data corresponding to the original color by reflecting the color distortion data at the time of performing the searches.

The second method is less precise than the first method because it requires a time for restoring the color when performing the search and it is a method to convert the feature data already summarized and extracted. However, the second method has a comparative advantage of restoring and searching the original color only when required, while maintaining the color data of the distorted image per se.

The embodiment described above was focused on the multimedia searching method characterized by taking the steps of extracting the features, and then restoring the color distortion data. The following description of another embodiment of the present invention will also be focused on the second method of using the color data for searching.

The embodiment according to the present invention provides an efficient searching system regardless of a color distortion, using local representative color data as features.

After dividing an image into N*M number of areas, the local representative color data are extracted from each divided area.

A similarity between two images is calculated by comparing the representative colors of the divided areas of the same position as sum of similarities of the two images.

Here, each image includes a hue and an intensity of the distorted color. Therefore, if any hue of the distorting color exists, the original color is restored by subtracting hue component of the distorting color from the representative color value as expressed prior to measuring the similarity in proportion to the intensity.

As described above, new value of the similarity is calculated by measuring the similarity between the restored representative colors.

The following is a description of the process of extracting the distorting color and restoring the original color by using the extracted color distortion data.

Figure 2:
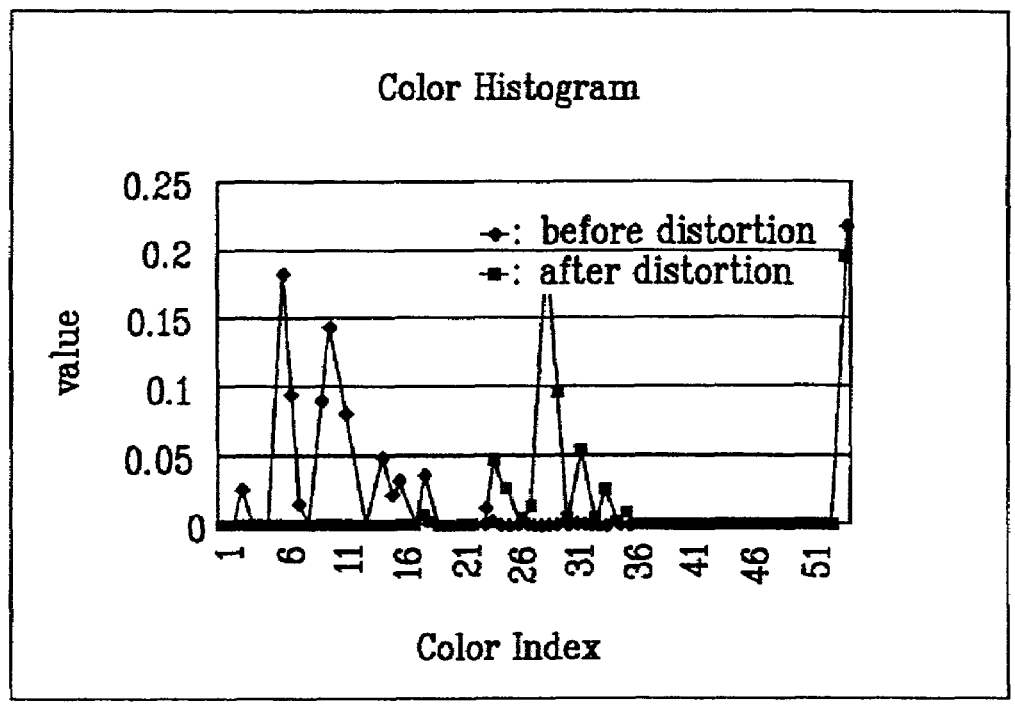
FIG. 2 is a graph illustrating difference between two color features extracted from an original image and an image distorted by a particular illumination.

FIG. 2 is a graph comparing two color feature data extracted from an original color and a color distorted from the original color by a particular illumination.

The graph in FIG. 2 shows that the original color image data have been distorted due to an illumination.

One of the two lines in the graph shows a color histogram extracted from the original image (before distortion), while the other line shows a color histogram extracted from the image distorted by an illumination (after distortion).

As shown in FIG. 2, positions of the main color have been shifted due to the distorting color by a certain reason, such as the illumination.

Thus, it is concluded that the color distortion considerably affects the color data such as a color histogram, and deteriorates the searching performance.

First Embodiment of a Method for Extracting Color Distortion Data

Figure 3A:
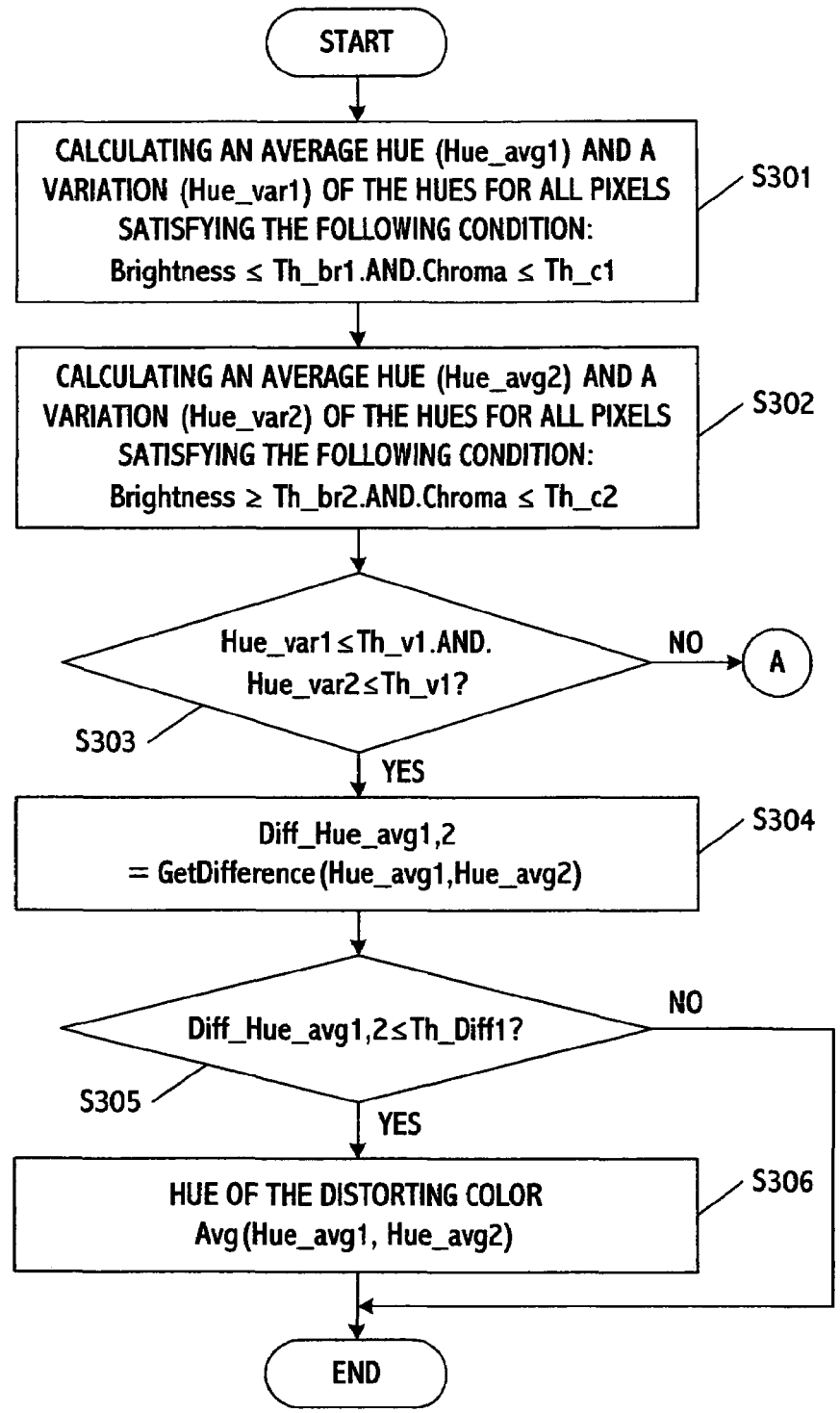
FIGS. 3A and 3B are flow charts illustrating the first embodiment of a method for extracting a distorting color according to the present invention.
Figure 3B:
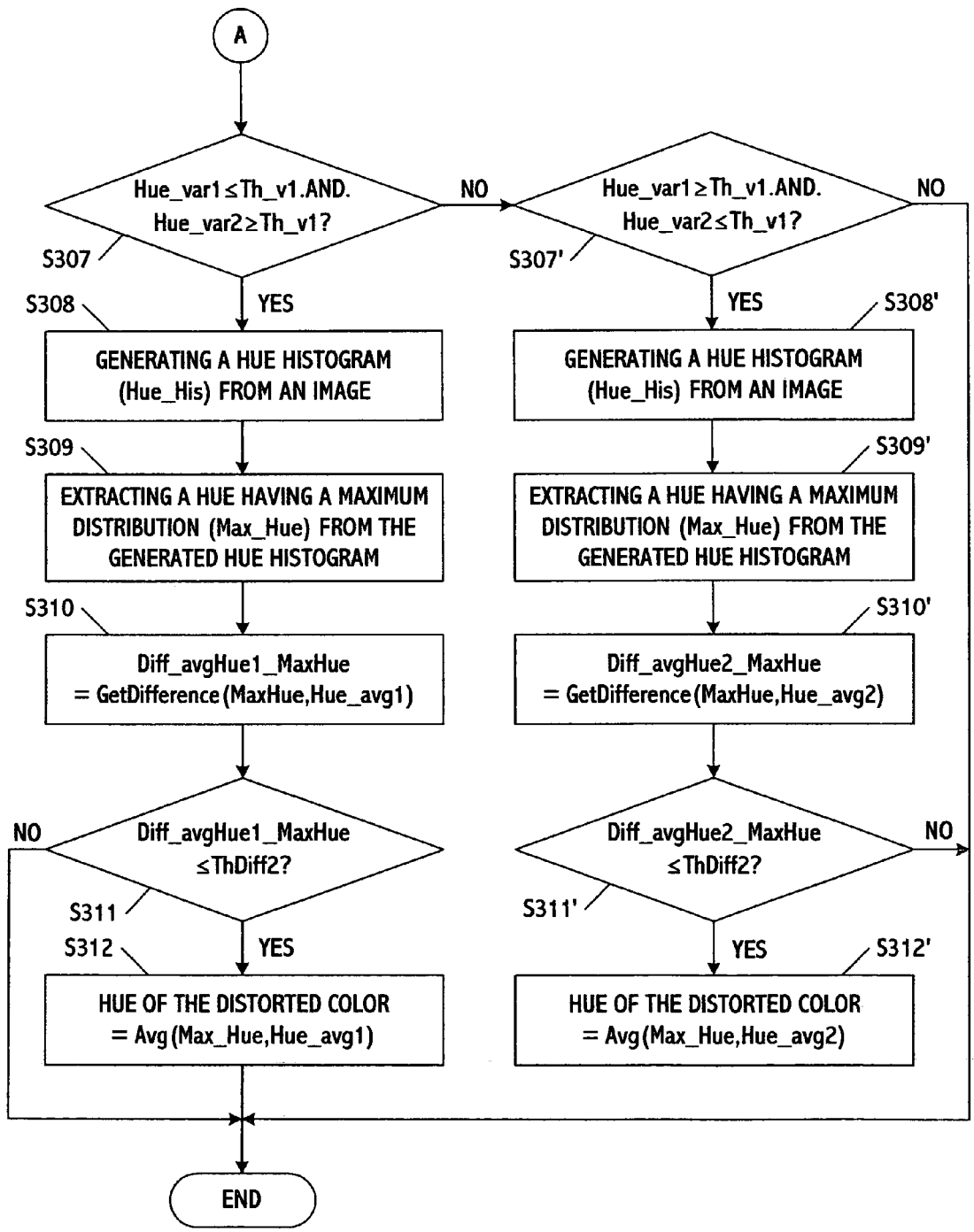

First embodiment of a method for extracting color distortion data according to the present invention will be described in detail with reference to FIGS. 3A and 3B.

At the first step, an average hue (Hue_avg1) and a variation of the hue (Hue_var1) are calculated for pixels having a brightness the same as or less than a predetermined critical value (Th_br1) and a chroma the same as or less than a predetermined critical value (Th_c1) (S301).

And then, an average hue (Hue_avg2) and a variation of the hue (Hue_var2) are calculated for pixels having a brightness the same as or greater than a predetermined critical value (Th_br2) and a chroma the same as or less than a predetermined critical value (Th_c1). (S302).

Summarizing the above processes, average hue and variation of the hues are calculated for the pixels having relatively low degrees of brightness and chroma as well as for the pixels having a medium degree of brightness and a low degree of chroma.

Two variation values (Hue_var1, Hue_var2) obtained by the above processes are compared with the predetermined critical value (Th_v1) given to the variation (Th_v1). (S303)

If both two variation values are the same as or less than the critical value (Th_v1), a difference (Diff_Hue_avg1,2) between the average hue values (Hue_avg1, Hue_avg2) is calculated (S304).

At the next step, a difference (Diff_Hue_avg1,2) between the two average hue values (Hue_avg1, Hue_avg2) is compared with a predetermined critical value (Th_Diff1). (S305).

If the difference (Diff_Hue_avg1,2) between the average hue values (Hue_avg1, Hue_avg2) is the same as or less than the predetermined critical value (Th_Diff1), a re-averaged value (Avg(Hue_avg1, Hue_avg2) of the two average hue values (Hue_avg2, Hue_avg2) is designated as a hue of the distorting color. (S306)

In the meantime, if the compared result at the step S303 shows that only one of the two variation values is the same as or less than the predetermined critical value (Th_v1) (S307 or S307'), a hue histogram for entire pixels of the image is generated. (S308) And then, a hue value having the maximum distribution (Max_Hue) is extracted. (S309).

For the purpose of description, herein, continuing processes will now be described with reference to the process (S307) for the pixels of a relatively low degree of brightness.

A difference (Diff_avgHue1_MaxHue) between the hue value having the maximum distribution (Max_Hue) and the average hue value (Hue_avg1) having the variation value same as or less than the critical value is extracted (S310).

The extracted difference (Diff_avgHue1_MaxHue) is compared with a predetermined critical value (Th_Diff2). (S311).

If the difference (Diff_avgHue1_MaxHue) is same as or less than the predetermined critical value (Th_Diff2), the hue having the maximum distribution obtained (Max_Hue) and the average hue value (Hue_avg1) extracted at step S309 are re-averaged. The re-averaged value (Avg(Max_Hue, Hue_avg1)) is designated as hue of the distorted color (S312).

The above process is to extract the hue of the distorting color by discriminating how much the hue having the maximum distribution is similar to the hue of the entire image.

This method for extracting color distortion data is advantageous in that it can be simply implemented. However, this method has a drawback that it is slightly difficult to identify whether the distorting color is appeared in the entire image or partially appeared in the image.

If such data could be identified, it is possible to use those data as a reference for measuring a degree that the distorting color locally affects to the image, i.e., an intensity, based on data how many local area the color distortion occurred in.

FIG. 4 shows another embodiment of a method for extracting color distortion data, including a further process for extracting the above-described intensity data.

Second Embodiment of a Method for Extracting a Distorted Color

An entire image is divided into N*M number of areas. (S401) Next, an object local area is set as a first area. Then, a number of the dark color candidates (N1) and a number of the bright color candidates (N2) are initialized, as discussed below.

The subsequent steps S403, S404, S405, S406, S407 and S408 are repeatedly performed to search the dark color candidates and the bright color candidates for each divided area.

Figure 4A:
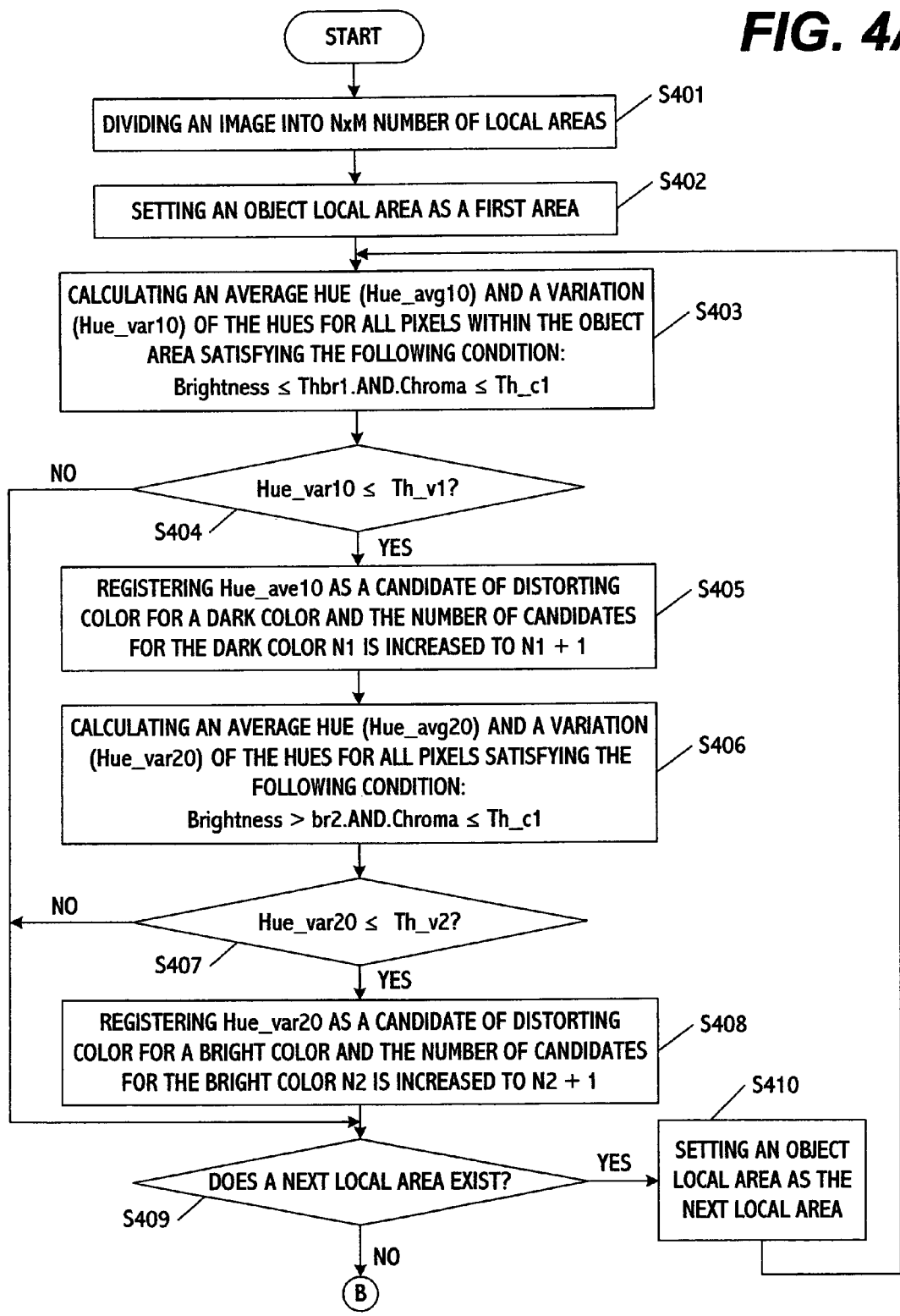
FIGS. 4A and 4B are flow charts illustrating the second embodiment of a method for extracting a distorting color according to the present invention.
Figure 4B:
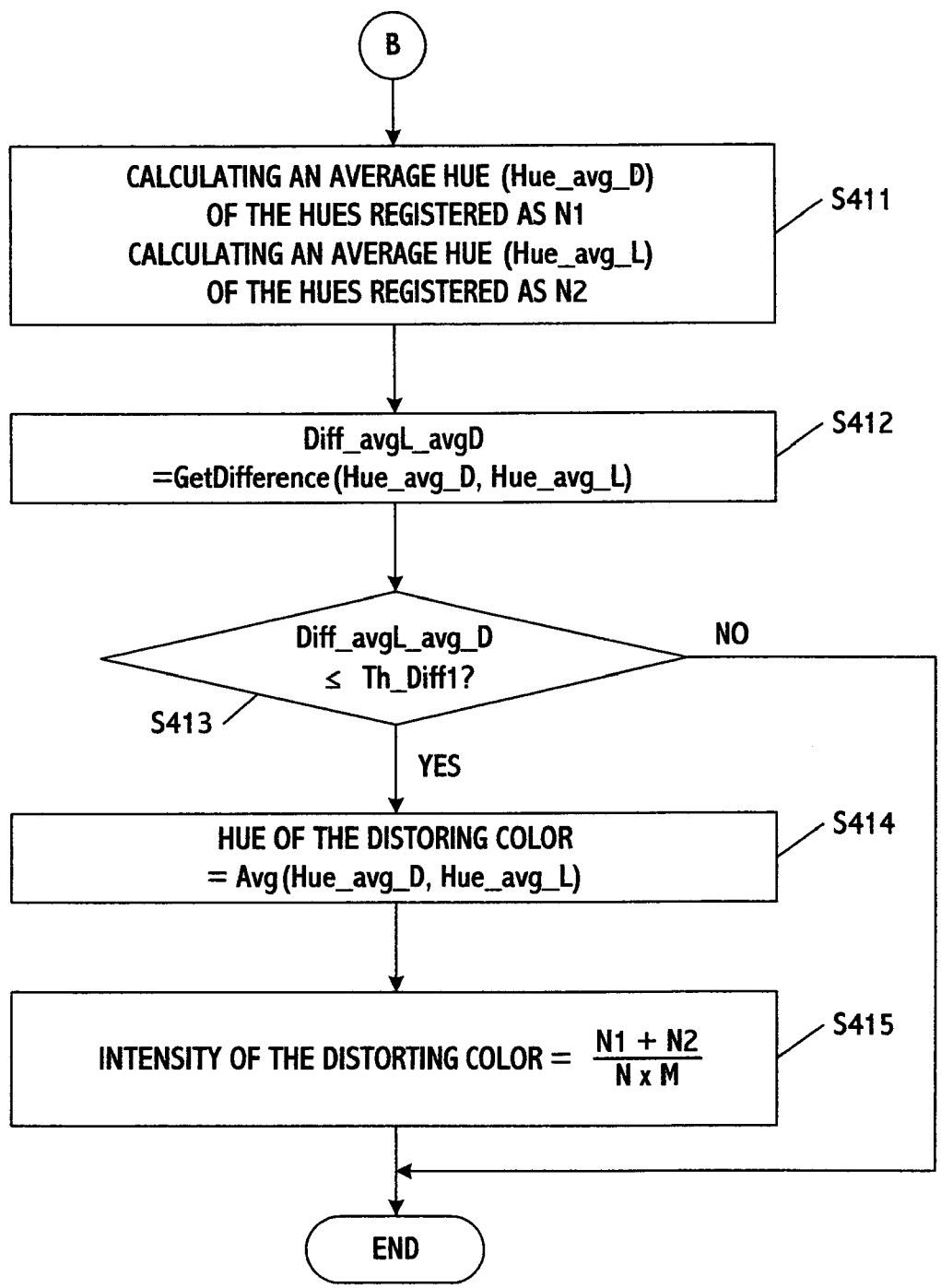

These steps will be described in more detail with reference to FIGS. 4A and 4B.

An average hue (Hue_avg10) and a variation of the hues (Hue_var10) are calculated for all pixels within the designated object area having a brightness value the same as or less than a predetermined critical value (Th_br1) and a chromatic value the same as or less than a predetermined critical value (Th_c1). (S403)

The variation of the hues (Hue_var10) is compared with a predetermined critical value (Th_v1). (S404). If the variation (Hue_var10) is the same as or less than the predetermined critical value (Th_v1), the hue is registered as a candidate for the distorting dark color, and the number of candidates for the dark color N1 is increased to be N1+1. (S405)

Similarly, a candidate for the distorting bright color is then extracted in step 406.

An average hue (Hue_avg2O) and a variation (Hue_var2O) of the hues are calculated for pixels within the designated object area having a brightness Value greater than a predetermined critical value (Th_br2) and a chromatic value the same as or less than a predetermined critical value (Th_c1). (S406)

The calculated variation value (Hue_var2O) is compared with a predetermined critical value (Th_v2) (S407). If the variation value (Hue_var2O) is the same as or less than the predetermined critical value (Th_v2), the hue is registered as a candidate for the distorting bright color, and the number of candidates for the bright color is increased to be N2+1. (S408)

Once both candidates of the distorting dark color and the distorting bright color have been obtained with respect to all of the object areas divided into N*M number, an average of the hues (Hue_avg_D) registered as the candidate for the distorting dark color as well as an average of the hues (Hue_avg_L) registered as the candidate for the distorting bright color are calculated. (S411)

Subsequently, a difference (Diff_avgL_avgD) between the average hues (Hue_avg_D, Hue_avg_L) is obtained (S412), and the obtained difference value (Diff_avgL_avgD) is compared with a predetermined critical value (Th_Diff1). (S413)

As a result of the comparison, if the difference (Diff_avgL_avgD) is the same as or less than the predetermined critical value (Th_Diff1), a re-averaged value (Avg (Hue_avg_D, Hue_avg_L) between the average of the hues (Hue_avg_D Hue_avg_L) is designated as a hue of the distorting color. (S414)

The number of candidate for the distorting dark color N1 is added to the number of candidates for the distorting bright color N2 and the sum of N1 and N2 are divided into N*M number of the object areas divided from the entire image. In other words, a ratio thereof is calculated and the ratio is designated as an intensity of the ultimate distorted color (S415)

Figure 5:
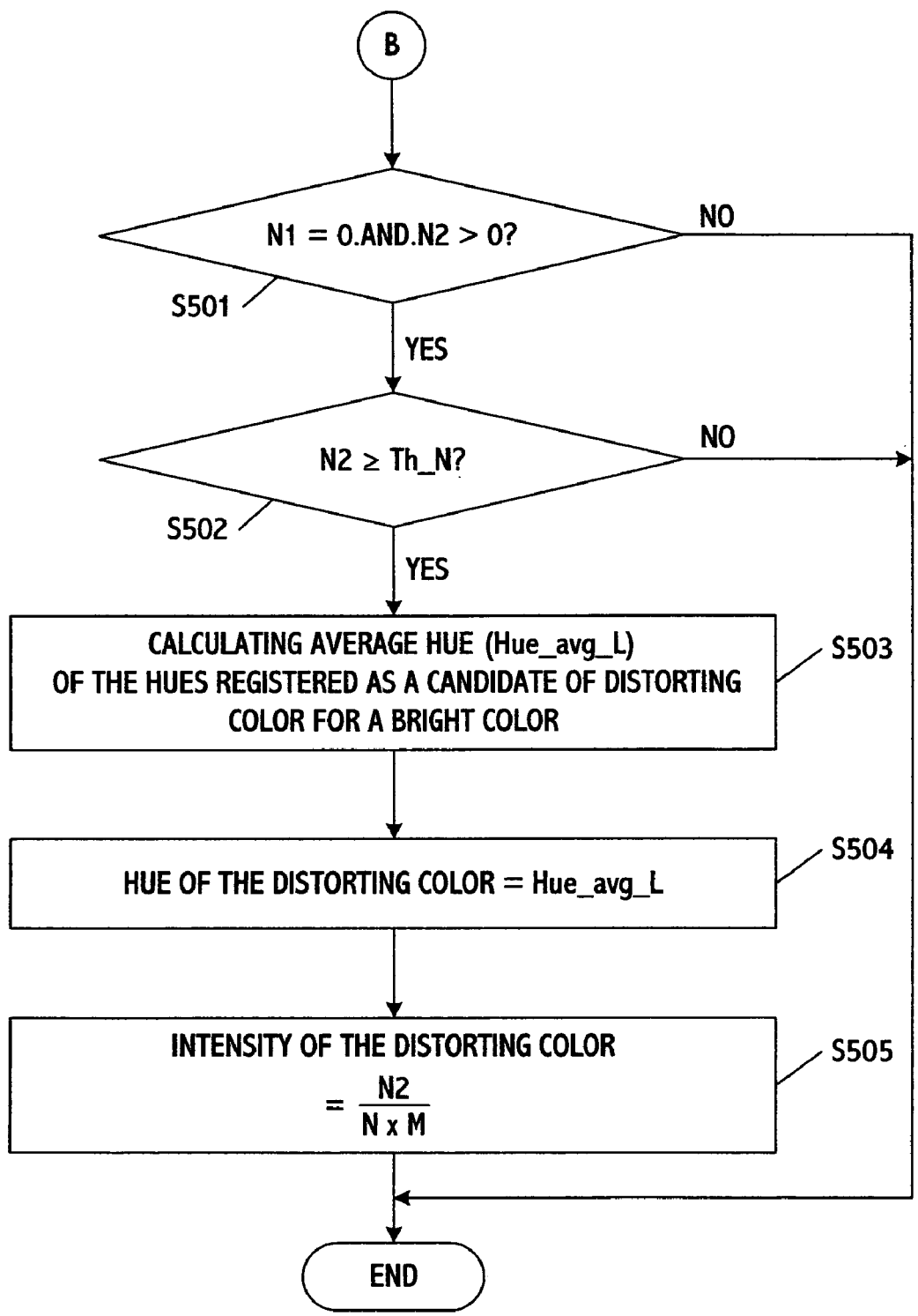
FIG. 5 is a flow chart illustrating the third embodiment of a method for extracting a distorting color according to the present invention.

Meanwhile, FIG. 5 shows a method for extracting a distorting color, when the candidates for distorting dark color and distorting bright color have been registered through the steps 401 through 410 as shown in FIG. 4, and when only one of the candidates for the distorting dark color or the distorting bright color has more than one stored hues.

After obtaining both the candidates of distorting dark color and bright color, the numbers N1, N2 of the candidates of distorting colors are identified. If the two candidates of distorting colors have more than one hue, the process shown in FIG. 4B is performed. If any one of N1 or N2 is 0, however, i.e., if neither N1 nor N2 have no hue, either N1 or N2 having more than one hues is compared with a reference number (Th_N) and proceeding process will be performed.

This embodiment describes the candidate for distorting bright color.

If the number of candidates for the distorting bright color is the same as or greater than the predetermined reference number (Th_N), an average of the hues registered as the candidate for distorting bright color (Hue_avg_L) is calculated. And the calculated average hue (Hue_avg_L) is designated as a hue of the distorting color. (S504)

The number of candidates for the distorting bright color N2 is divided into N*M number of object areas divided from the entire image. In other words, the ratio thereof is calculated and considered as an intensity of the distorting color.

The embodiment shown in FIG. 5 is a solution when a distortion has been occurred in one direction.

The original color can be restored based on the color distortion data extracted as described above and can be used for a highly efficient searching system.

The distorting color described above is expressed by a hue component and intensity of the hue.

If any distorting color values exists, the original color is restored in the following manner.

If the distorting color value has been expressed by another color coordinate other than R, G, B, a relative distribution value of R, G, B is calculated.

Here, the relative distribution value can be obtained by assuming MAX(RGB) and MIN(RGB) values as predetermined constants. In the embodiment of the present invention, the MAX(RGB) and MIN(RGB) values are assumed to be 255 and 0, respectively.

The formula for obtaining the relative distribution is expressed in Equation 1 below.

To be specific, one R, G, B value is obtained with respect to the hue value, and a distorting color value R, G, B is obtained by multiplying the R, G, B value by the predetermined constants. The original color is restored by subtracting the distorting color value R, G, B from the distorted R, G, B value.

The constants used for restoring the original color can be set by reference to the intensity data included in the color distortion data. The constants can be determined as an intensity value or a predetermined constant value that is proportion to the intensity.

[Equation 1]

When a hue is represented by an angle ranged from 0 to 360,
if (Hue = = −1)
{
R=0;
G=0;
B=0;
}
else
{
    if (Hue = = 360.0) Hue = 0.0;
Hue = Hue/60.0;
i = integer value of the hue value
f = decimal value of the hue value
if (i = = 0)
{
    R = 255; G=255*f, B = 0
}
Else if(i = = 1)
    R = 255*(1−f); G = 255; B = 0;
}
Else if(i = =2)
{
    R = 0; G = 255; B = 255*f;
}
Else if(i ==3)
{
    R = 0; G = 255*(1−f); B = 255
}
Else if(i = = 4)
{
    R=255*f G = 0; B = 255
}
Else if(i == 5)
{
    R = 255; G = 0; B = 255*(1−f)
}
}

Figure 6:
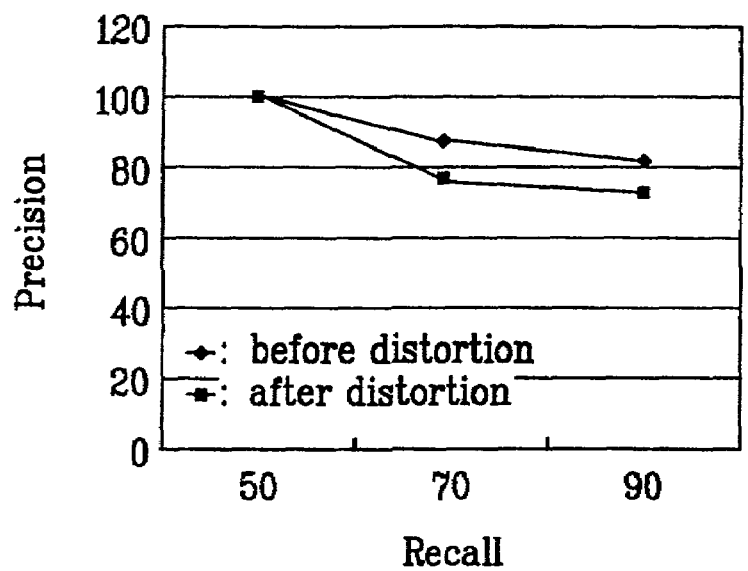
FIG. 6 is a graph illustrating a difference in searching performances between a case of searching non-distorted image database and another case of searching distorted image database, where local representative color features were used.

FIG. 6 is a graph illustrating a difference in searching performance between a case of searching non-distorted image database and another case of searching distorted image database, where local representative color features were used. In FIG. 6, the recall in the horizontal axis shows how many images to be searched as a right answer were represented as a search result, while the precision in the vertical axis represents how many precise images were included in the searched image.

As shown in FIG. 6, the average precision is decreased by 10 percent due to the color distortion.

Figure 7:
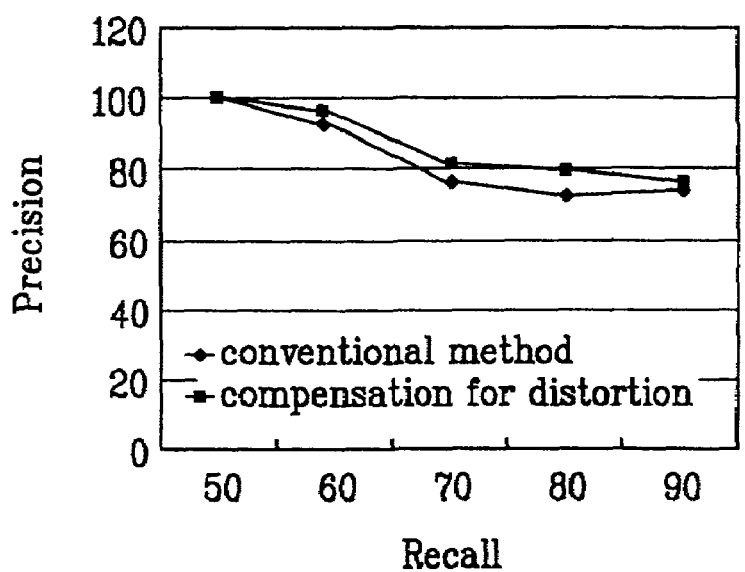
FIG. 7 is a graph illustrating a difference in searching performances between a case of applying the method according to the present invention and another case of applying the conventional method.

FIG. 7 shows that searching performance was enhanced when the color restoring method using the color distortion data has been applied according to the present invention. As shown in FIG. 7, increase of errors caused by the color distortion has been reduced by about 50 percent.

Figure 8:
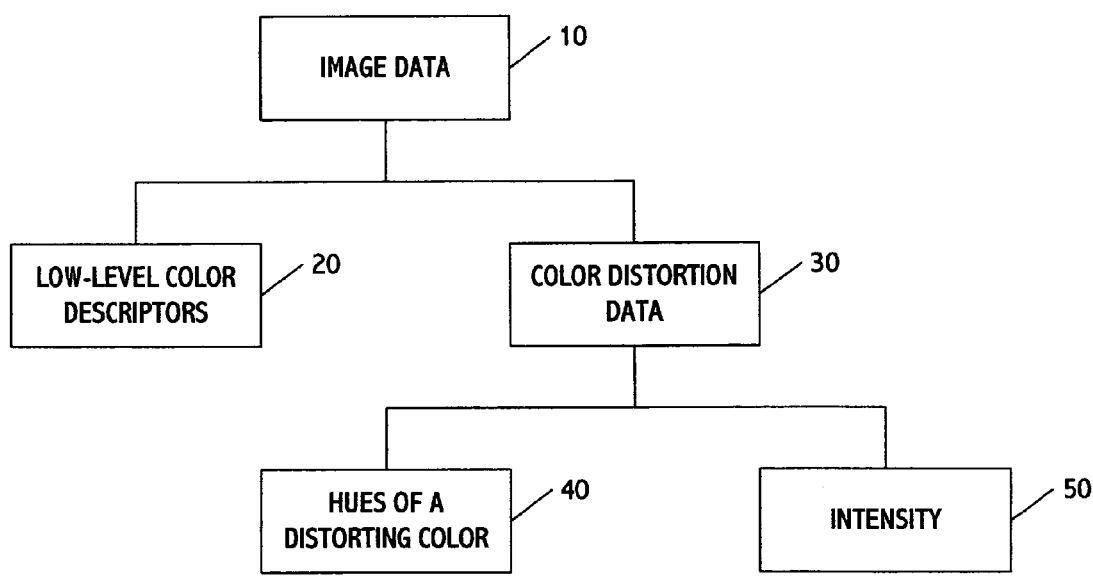
FIG. 8 is a block diagram illustrating a multimedia image data generating method according to the present invention as a form of data structure.

FIG. 8 illustrates a multimedia data generating method according to the present invention as a form of data structure to realize multimedia searches by using the color distortion data. The method according to the present invention incorporates feature data and then incorporates color distortion data for the search. The image data 10 includes the color distortion data 30 together with low-level descriptors 20 including the features for multimedia searches.

The color distortion data 30 comprise a hue of distorting color 40 representing which color affected the color distortion, and intensity data 50 representing how much the color distortion data affected.

The present invention described above is not limited to the embodiment shown in FIG. 8, but is variable so as to include any one or both of the color distortion data and/or the distortion intensity data in the distortion data.

As described above, the present invention serves to prevent deterioration of the searching performance caused by distortion of the color data inserted by nature of an illumination or a device.

Further, the present invention provides advantages of utilizing a useful function of itself that can restore an image having a distorting color to the original image and other additional effects followed by using such color distortion characteristics.

For instance, when extracting a color region of a particular object such as a skin color, the object region can be extracted irrespective of an illumination by using the color restoring method using the color distortion data, even if the color region of a particular object is variable depending on the illumination.

Moreover, since data of the distorting color per se represents characteristics of a device or a filter used for capturing an image, the data having the same filter can be grouped by using such characteristics.

What is claimed is:

1. A content-based multimedia searching method using color distortion data, the method comprising:
   extracting color distortion data from multimedia data;
   restoring the distorted color of the multimedia data to the original color by using the extracted color distortion data;
   measuring a similarity between the multimedia data restored to the original color; and
   aligning the multimedia data on the basis of the measured similarity.

2. The content-based multimedia searching method of claim 1, wherein the extracted color distortion data are hue data.

3. A content-based multimedia searching method using color distortion data, the method comprising:
   extracting color distortion data from multimedia data;
   extracting features to be used for the search;
   storing the extracted features and the color distortion data;
   restoring a value of the features to values corresponding to the features of the original color by using the stored color distortion data;
   measuring a similarity between the multimedia data by using the restored value of the features; and
   aligning the multimedia data on the basis of the measured similarity.

4. The content-based multimedia searching method of claim 3, wherein the extracted color distortion data are hue data.

5. The content-based multimedia search method of claim 3, wherein the extracted color distortion data further include intensity data of the distorting color.

6. The content-based multimedia searching method of claim 3, wherein restoring the original color comprises:
   converting a distorting color value to an R, G, B value satisfying the hue value of the color distortion data, assuming that max (RGB) and min (RGB) values are fixed to predetermined constants; and
   calculating a relative variation of the distorting color value by multiplying the R, G, B value of the hue value by predetermined constants, and subtracting the distorting color value from original R, G, B value for each pixel.

7. A content-based multimedia searching method using color distortion data, the method comprising:
   extracting a hue value of a distorting color as color distortion data from multimedia data,
   dividing an image into N*M number of local areas and extracting representative color values of each area as features to be used for the search;
   storing the extracted features and the color distortion data;
   restoring the representative color values of each area to a value corresponding to the original color by using the hue value of the stored distorting color;
   measuring a similarity between the multimedia data by using the restored value of the features; and
   aligning the multimedia data on the basis of the measured similarity.

8. The content-based multimedia searching method of claim 7, wherein the extracted color distortion data further include intensity data of the distorting color.

9. The content-based multimedia searching method of claim 7, wherein restoring the original color comprises:
   converting a distorting color value to an R, G, B value satisfying the hue value of the color distortion data, assuming that max (RGB) and min (RGB) values are fixed to predetermined constants; and
   calculating a relative variation of the distorting color value by multiplying the R, G, B value of the hue value by predetermined constants, and subtracting the distorting color value from original R, G, B value for each pixel.

10. The content-based multimedia searching method of claim 9, wherein the extracted color distortion data further include intensity data, and the predetermined constants are intensity values or values proportional to the intensity values.

11. The content-based multimedia searching method of claim 9, wherein the max(RGB) value is set as 255 and the min(RGB) value is set as 0.

12. A method for extracting color distortion data, comprising:
   calculating an average hue and a variation of the hue values for all pixels having a brightness value and a chromatic value, which are the same as or less than a predetermined critical value;
   calculating an average hue and a variation of the hue values for all pixels having a brightness value the same as or greater than a predetermined critical value and a chromatic value the same as or less than a predetermined critical value; and
   designating a re-averaged value of the two average hue values as a hue of the distorting color, if both of the two variation values calculated as above are the same as or less than a predetermined critical value and a difference between the two average hue values is the same as or less than a predetermined critical value.

13. The method of claim 12, further comprising, if only one of the two variation values is the same as or less than the predetermined critical value:
   generating a hue histogram for all pixels of an image;
   extracting a hue having a maximum variation value in the generated hue histogram; and designating an average value between the extracted hue value and the average hue value having a variation the same as or less than the predetermined critical value as a hue of the distorting color, if the variation of the extracted hue is the same as or greater than a predetermined critical value.

14. A method for extracting color distortion data, comprising:

dividing an image into N*M number of areas;

calculating an average hue and a variation of the hue value for all pixels having a brightness value and a chromatic value the same as or less than a predetermined critical value for each divided area, and register the average hue as a candidate of distorting color for a dark color only when the variation is the same as or less than a predetermined critical value;

calculating an average hue and a variation of the hue value for all pixels having a brightness value the same as or greater than a predetermined critical value and a chromatic value the same as or less than a predetermined critical value for each divided area, and register the average hue as a candidate of distorting color for a bright color only when the variation is the same as or less than a predetermined critical value;

calculating an average of the hues registered as the candidate of distorting color for a dark color and an average of the hues registered as the candidate of distorting color for a bright color, and designating a re-averaged hue value of the two average hue values as a distorting hue if a difference between the two average hue values is the same as or less than a predetermined critical value;

calculating a ratio of the number of the registered candidate hues to N*M number of object areas divided from the entire image; and designating the ratio as an intensity of the color distortion.

15. The method of claim 14, further comprising, if there are registered hues in only one of the candidate of distorting bright color or the candidate of distorting dark color:

designating an average hue value of the registered hues as a distorting hue only when the number of registered hues are the same as or greater than a predetermined critical value;

calculating a ratio of the number of registered hues to N*M number of object areas divided from the entire image; and designating the ratio as an intensity of the color distortion.

16. A method for generating multimedia data in order to be used in a content-based multimedia search, comprising:

incorporating feature information; and incorporating color distortion data, wherein the color distortion data comprises hues of a distorting color identifying which color affected such a color distortion and intensity data representing how much the color distortion data affected such a color distortion.

17. A content-based multimedia searching system, comprising:

a feature extracting unit including a feature extracting module configured to extract necessary features for the search, a color distortion data extracting module configured to extract color distortion data, and a storing module configured to store extracted features and color distortion data; and a search unit including a color restoring module configured to receive stored features and color distortion data and restore distorted color value into original color value using the color distortion data, a similarity calculation module configured to calculate a similarity between object data, and a data alignment module configured to display the object data based on the calculated similarity.

18. The content-based multimedia searching system of claim 17, wherein the color distortion data are hues of a distorting color.

19. The content-based multimedia searching system of claim 17, wherein the color distortion data further include intensity of the distorting color.

20. The content-based multimedia searching system of claim 17, further comprising a user query interface configured to input a user inquiries and a display interface configured to display search results.

* * * * *